(12) United States Patent
Cuddeback (10) Patent No.: US 8,810,718 B1
(45) Date of Patent: Aug. 19, 2014

(54) HYBRID IR FLASH FOR TRAIL CAMERA (71) Applicant: Non Typical, Inc., De Pere, WI (US)

(72) Inventor: Mark O. Cuddeback, Green Bay, WI (US)

(73) Assignee: Non Typical, Inc., De Pere, WI (US)

(*) Notice: Subject to any disclaimer, the term of this patent is extended or adjusted under 35 U.S.C. 154(b) by 0 days.

(21) Appl. No.: 13/788,889

(22) Filed: Mar. 7, 2013

(51) Int. Cl.
*H04N 5/222* (2006.01)
*H04N 5/232* (2006.01)
*H04N 5/225* (2006.01)
*G03B 15/03* (2006.01)

(52) U.S. Cl.
CPC ......... *H04N 5/2256* (2013.01); *H04N 5/23245* (2013.01)
USPC ............................. 348/371; 348/370; 396/164

(58) Field of Classification Search
USPC .................. 348/370, 371; 396/155, 164–166, 396/171–178
See application file for complete search history.

(56) References Cited

U.S. PATENT DOCUMENTS

| 7,667,766 | B2* | 2/2010 | Lee et al. ................. 348/370 |
|---|---|---|---|
| 2006/0082995 | A1* | 4/2006 | Chua et al. ............... 362/231 |
| 2006/0257130 | A1* | 11/2006 | Lee et al. ................. 396/106 |
| 2007/0019941 | A1* | 1/2007 | Cross et al. .............. 396/263 |
| 2007/0147811 | A1* | 6/2007 | Nakao et al. ............... 396/18 |
| 2010/0007765 | A1* | 1/2010 | Myhrvold et al. ....... 348/223.1 |
| 2010/0238344 | A1* | 9/2010 | Tsai ......................... 348/361 |
| 2012/0026356 | A1* | 2/2012 | Nakagawara ........... 348/223.1 |
| 2012/0044374 | A1* | 2/2012 | Pohlert et al. .......... 348/220.1 |
| 2012/0121244 | A1* | 5/2012 | Stavely .................... 396/175 |
| 2012/0327225 | A1* | 12/2012 | Barley et al. ............ 348/143 |
| 2012/0327242 | A1* | 12/2012 | Barley et al. ............ 348/155 |

* cited by examiner

*Primary Examiner* — Kelly L Jerabek
(74) *Attorney, Agent, or Firm* — Michael Best & Friedrich LLP (57) ABSTRACT

A camera assembly including a camera that has an image-capturing device. The camera assembly also includes an illumination device that is coupled to the camera and that is adapted to illuminate a subject when the camera is capturing an image, and a control unit. The illumination device is capable of illuminating in at least two different peak wavelengths. The control unit automatically configures the camera assembly to use one or more of the at least two different wavelengths.

16 Claims, 5 Drawing Sheets

HYBRID IR FLASH FOR TRAIL CAMERA

BACKGROUND

The present invention relates generally to trail cameras and, more specifically, to trail cameras having infrared flash illumination for taking a picture or video.

Trail cameras (commonly called "trail cams") are used to take pictures or videos of certain subjects, such as wildlife. Trail cams often include a light source for illuminating the subject when capturing images in low-light conditions. Such light sources can include visible light or infrared light. Infrared light is often preferred when it is desired not to create a visible flash (e.g., in order to avoid startling the subject).

Infrared lighting for cameras is typically specified at 850 nm, which produces light in a range of wavelengths surrounding 850 nm. At this specification, a small amount of visible light can often be seen in the form of a red glow. Infrared lighting with a specification of 950 nm is designed to significantly reduce or eliminate the visible red glow. However, at that longer wavelength, the camera is less efficient, and thus the quality of the image suffers.

SUMMARY

The present invention provides a camera assembly including a camera that has an image-capturing device and an illumination device coupled to the camera and adapted to illuminate a subject when the camera is capturing an image. The illumination device is capable of illuminating in at least two different peak wavelengths. The camera assembly also includes a control unit that automatically configures the camera assembly to use one or more of the at least two different wavelengths.

The invention is also embodied in a method of operating a camera assembly including a camera that has an image-capturing device and an illumination device capable of a illuminating at a plurality of peak wavelengths, and that has an operating parameter. The method includes determining the operating parameter of the camera, selecting a selected peak wavelength based upon the operating parameter, capturing an image with the image-capturing device, and operating the illumination device at the selected peak wavelength during the capturing step.

The invention also provides a camera assembly including a housing that defines a pocket and that supports a camera having an image-capturing device. The camera assembly also includes a first illumination device removably coupled to the housing within the pocket and adapted to illuminate a subject at a peak wavelength when the camera is capturing an image, and a second illumination device removably coupled to the housing within the pocket adjacent the first illumination device and adapted to illuminate a subject at a peak wavelength when the camera is capturing an image. The camera assembly further includes a control unit that automatically configures the camera assembly to use one or both of the first and second illumination devices to illuminate a subject.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
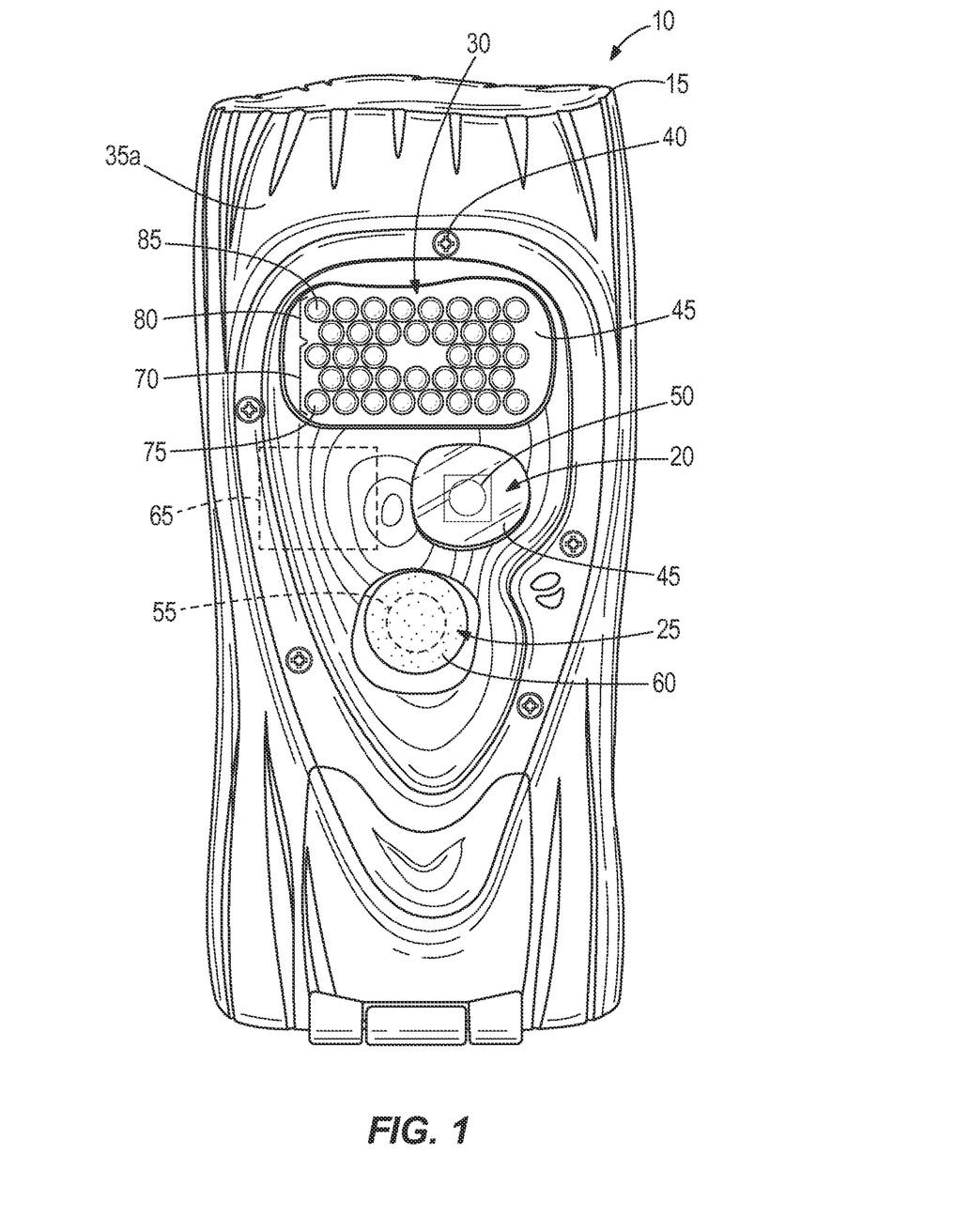
FIG. 1 is a front view of a camera assembly including a camera and an illumination device embodying the invention.
Figure 2:
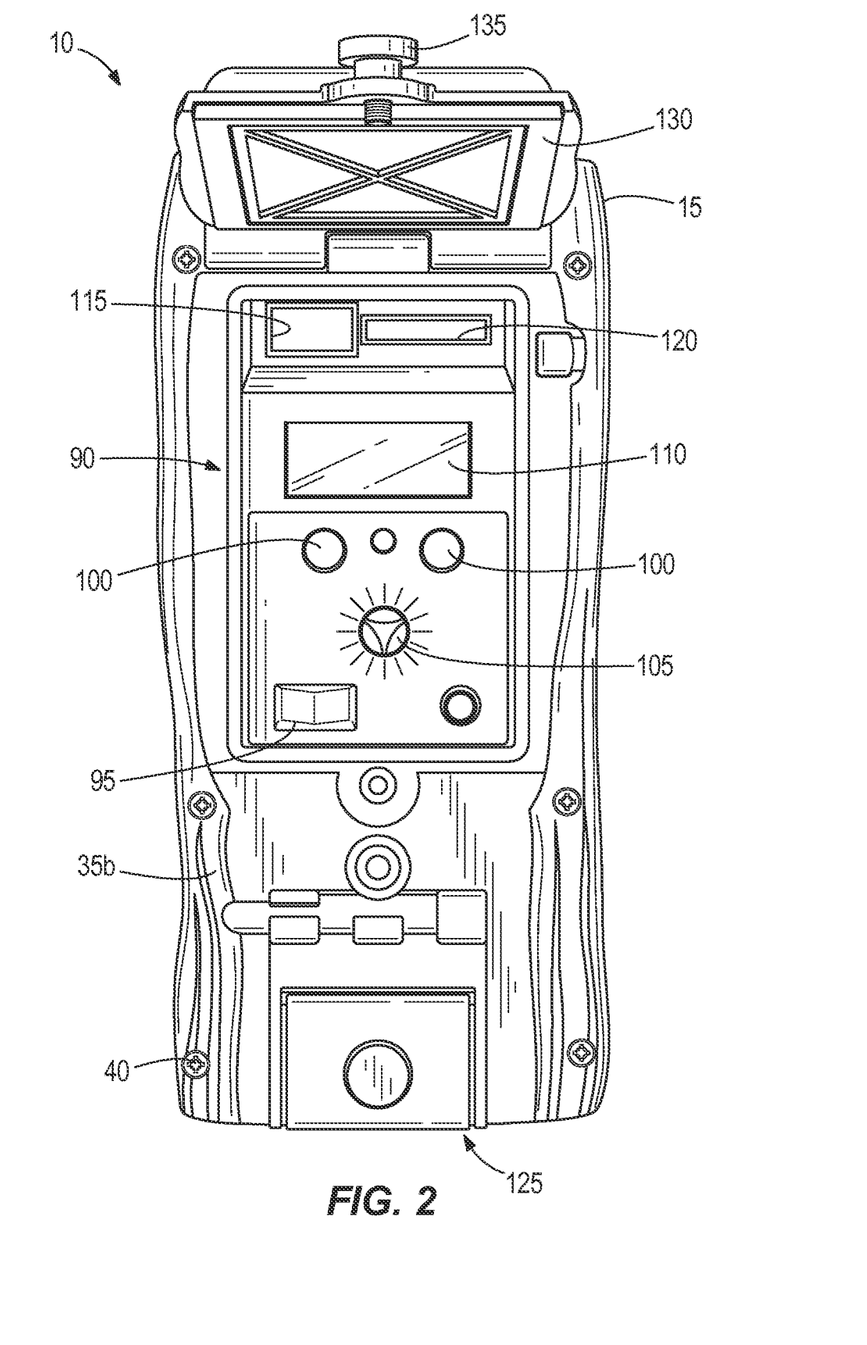
FIG. 2 is a rear view of the camera assembly including a user interface.
Figure 3:
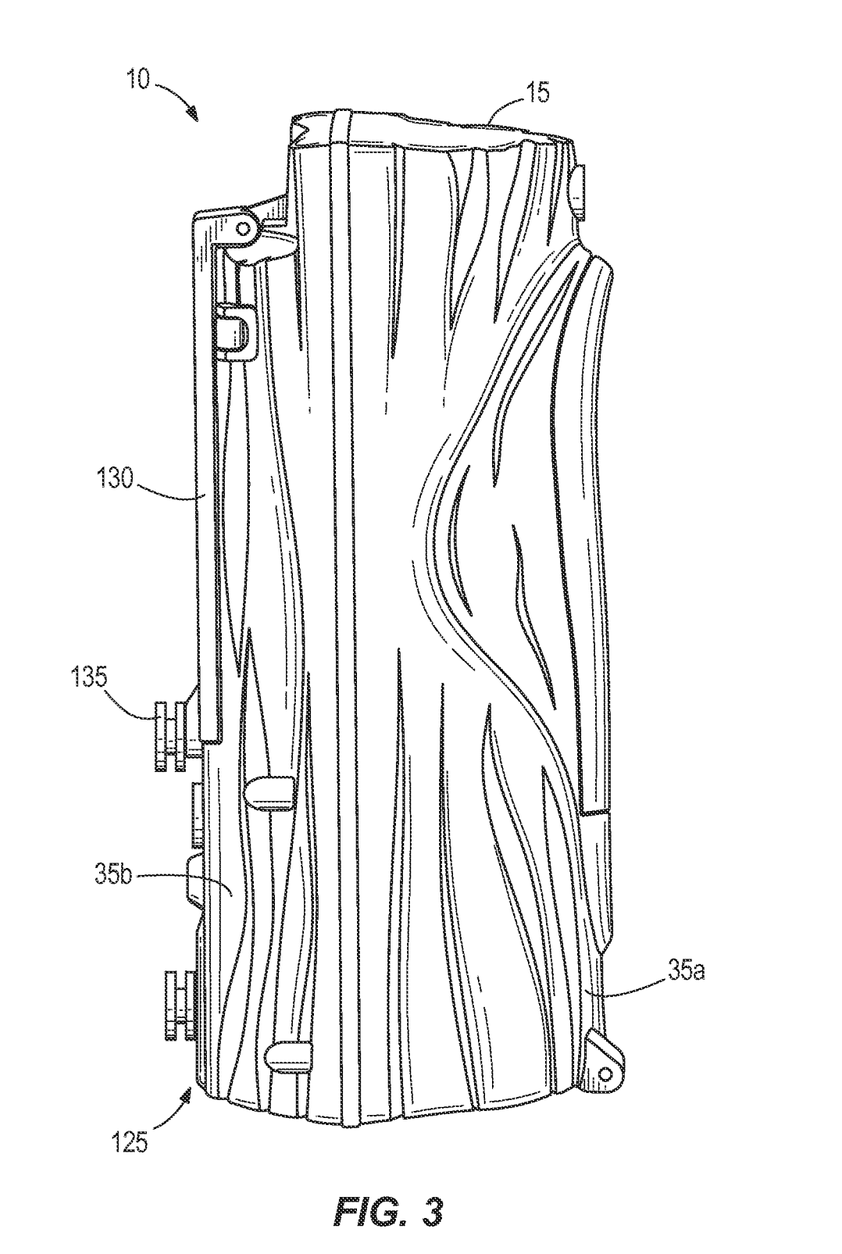
FIG. 3 is a side view of the camera assembly of FIG. 1.

FIGS. 1-3 illustrate a wildlife surveillance system or camera assembly 10 that can be attached to a mounting structure (e.g., a tree, a post, etc.). The camera assembly 10 includes a housing 15 that supports a camera 20, a detector 25, and an illumination device 30 for taking pictures and/or video (described collectively as media) of subjects (e.g., wildlife). As shown in FIG. 3, the illustrated housing 15 is defined by split-housing portions 35a, 35b, that are attached to each other (e.g., using fasteners 40 or adhesive) to enclose the camera 20, the detector 25, the illumination device 30, and other components of the camera assembly 10. With reference to FIG. 1, the housing 15 has transparent windows 45 so that the camera 20, the illumination device 30, and the detector 25 are protected from the environment while also providing exposure (i.e., a clear line of sight) for the camera 20, the illumination source, and the detector 25.

The camera 20 includes an image-capturing device 50 (e.g., a digital receiver) that has a still image mode for obtaining still images of subjects, and a video image mode for obtaining video images of subjects. In some constructions, the camera 20 also can include a hybrid or multi-image mode for obtaining still and video images of subjects (e.g., consecutively or at timed intervals). Each of the still image mode, the video image mode, and the hybrid image mode defines an operating parameter of the camera 20 that impacts how the subject is illuminated, as described in detail below.

The illustrated detector 25 includes a passive infrared ("PIR") sensor 55 and a lens 60 (e.g., a Fresnel lens). The sensor 55 detects a subject and outputs a signal to a processor or control unit 65 in response to detection of the subject. The lens 60 defines a field of view of the detector 25 and focuses infrared radiation generated or reflected by a warm subject in the field of view onto the PIR sensor 55. Generally, the detector 25 can have a wide field of view (e.g., approximately 45-180°) to encompass a large area of the environment in front of the camera assembly 10, a narrow field of view (e.g., approximately 15-45°), or a combination thereof.

The illumination device 30 is capable of illuminating a subject in at least two different peak wavelengths of light when the camera 20 is capturing an image. With reference to FIG. 1, the illustrated illumination device 30 includes a first light source 70 that has light elements 75 (e.g., LEDs, strobe, etc.) and a second light source 80 that has light elements 85 (e.g., LEDs, strobe, etc.) disposed above the first light source 70, although the relative orientation can be reversed. Each illustrated light source 70, 80 includes multiple light elements 75, 85. In some constructions, the light sources 70, 80 can be arranged side-by-side or in other patterns. Furthermore, the first and second light sources 70, 80 can be arranged so that individual light elements 75, 85 are interspersed among each other randomly or in a pattern. For example, one LED 75 of the first light source 70 can be positioned next to one or more LEDs 85 of the second light source 80, and vice versa.

In the illustrated construction, the first light source 70 emits infrared light at a first peak wavelength, and the second light source 80 emits infrared light at a second peak wavelength. For example, the first peak wavelength can be approximately 850 nanometers ("nm"), and the second peak wavelength is longer than the first peak wavelength and can be approximately 940 nm, although the first and second light sources 70, 80 can have other wavelengths. For example, the first peak wavelength can be between approximately 740 nm and approximately 900 nm, and the second peak wavelength can be at or above 875 nm. Generally, light that is visible to a subject has a wavelength of approximately 770 nm (i.e., the visible wavelength).

Because the first peak wavelength is relatively close to the visible wavelength (i.e., only somewhat longer), the first light source 70 produces some light that may be visible to the subject whose image is being captured. On the other hand, the second peak wavelength of the second light source 80 is much longer than the visible wavelength and, as a result, produces light that is essentially invisible to the subject. In some constructions, illumination device 30 can include one or more additional light sources with peak wavelengths of light that are different from the first and second peak wavelengths, such as within the visible wavelength range. Also, the illumination device 30 can include the same or different quantities of light elements 75, 85 associated with the respective peak wavelengths based in part on the desired strengths of light distributed by each light source 70, 80. As illustrated in FIG. 1, the quantity of light elements 75 associated with the first light source 70 exceeds the quantity of light elements 85 associated with the second light source 80. In some constructions, the first and second light sources 70, 80 can include an equal quantity of respective light elements 75, 85. In other constructions, the quantity of light elements 85 associated with the second light source 80 can exceed the quantity of light elements 75 associated with the first light source 70.

The housing 15 supports a user interface 90 for controlling the camera assembly 10 and determining the state of the camera assembly 10. As illustrated in FIG. 2, the user interface 90 is disposed along the rear side of the camera assembly 10, and has a selector switch 95, button switches 100, a rotary dial 105, and a display 110. The selector switch 95 is a three-position toggle that controls the camera mode (e.g., still image mode, video image mode, and hybrid image mode). The button switches 100 and the rotary dial 105 can be manipulated by the user to control the camera assembly 10, and to obtain information regarding the state of the camera assembly 10 (e.g., adjusting the programmable settings of the camera assembly 10 such as the time interval between images, the time of day, etc.). The settings and the information associated with the camera assembly 10 can be viewed on the display 110.

The camera assembly 10 also includes electrical and/or electronic connections (e.g., USB port 115, media storage port 120, etc.) to facilitate storage and retrieval of media from the camera assembly 10. A power source 125 (e.g., batteries) is provided to power components of the camera assembly 10 and to facilitate downloading media stored in the camera 20. As illustrated, a cover 130 is pivotally coupled to the housing 15 to enclose the user interface 90 and the electronic connections (e.g., to protect the user interface 90 from debris, water, sunlight, rain, etc.) when not in use. A fastener 135 secures the cover 130 to the housing 15. As will be appreciated, the camera assembly 10 can include other components (e.g., additional sensors, not specifically discussed herein).

With reference to FIGS. 1 and 2, the control unit 65 is disposed in the housing 15 and is in communication with the camera 20, the detector 25, the illumination device 30, and the user interface 90 to control functions of the camera assembly 10. The detector 25 triggers the camera 20 to take a picture or start a video, or both consecutively, when the PIR sensor 55 detects and responds to infrared light (or a change in infrared light) within the field of view of the detector 25. More specifically, the control unit 65 receives information from the sensor 55 and is programmed to actuate the camera 20 when the subject is within the field of view.

Figure 4:
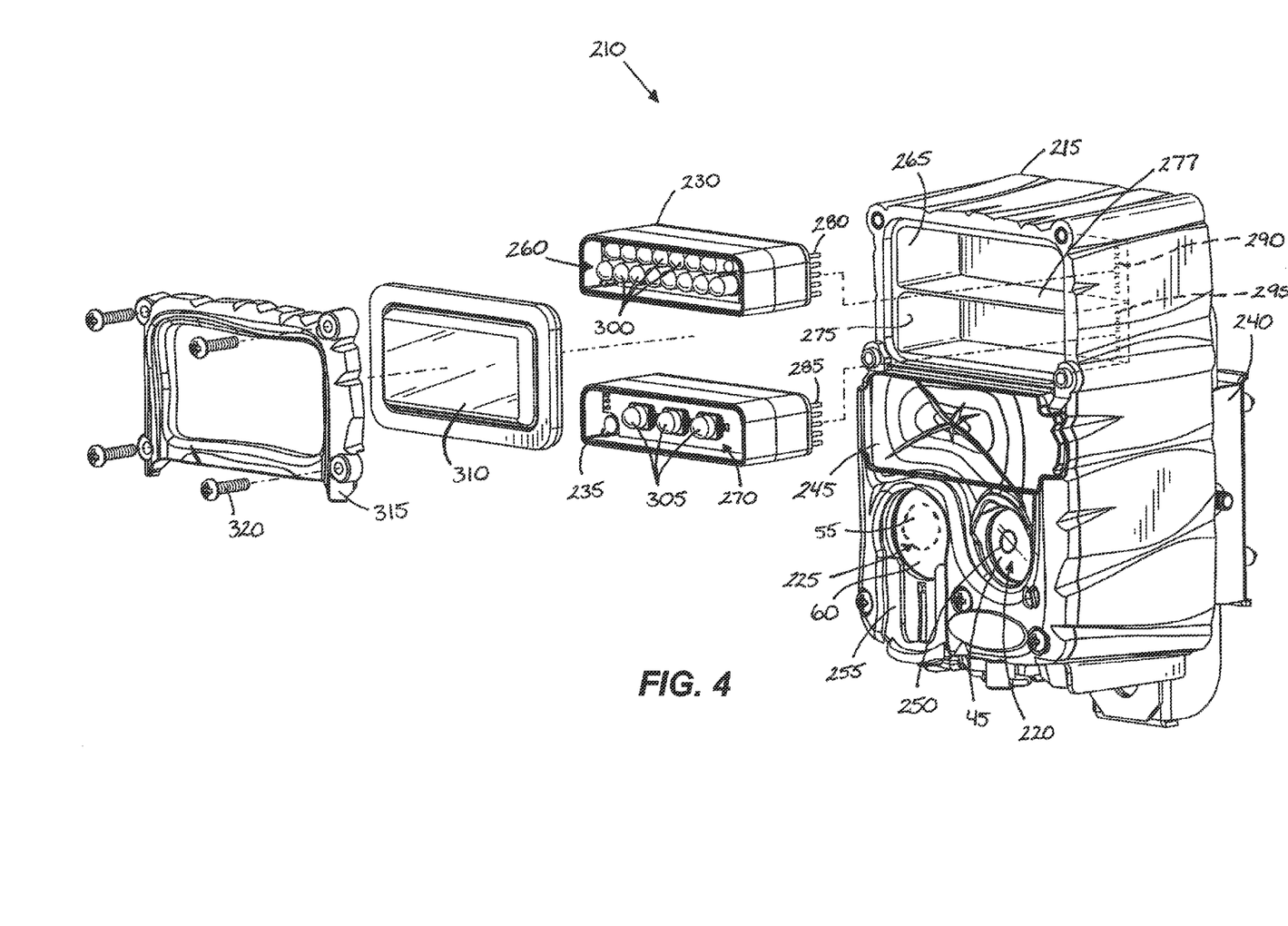
FIG. 4 is a perspective view of another camera assembly including the camera and an illumination device embodying the invention.

FIG. 4 illustrates another camera assembly 210 that can be attached to a mounting structure (e.g., a tree, a post, etc.). Except as described below, the camera assembly 210 is the same as the camera assembly 10 described with regard to FIGS. 1-3.

The camera assembly 210 includes a housing 215 that supports a camera 220, a detector 225, and first and second illumination devices 230, 235 for taking pictures and/or video (described collectively as media) of subjects (e.g., wildlife). As shown in FIG. 4, the illustrated housing 215 can be supported on a structure (e.g., a post, tree, etc.) via a mount 240. The illustrated housing 215 encloses the camera 220, the detector 225, the illumination devices 230, 235, and other components of the camera assembly 210. As illustrated, a strap closure 245 (e.g., formed of a soft, resilient material) is attached to the housing 215 to enclose a user interface (e.g., to protect the user interface from debris, water, sunlight, rain, etc.) when not in use. The user interface is similar to the user interface 90 described above. As will be appreciated, the camera assembly 210 can include other components (e.g., additional sensors, not specifically discussed herein).

The camera 220 includes an image-capturing device 250 (e.g., a digital receiver) that has a still image mode for obtaining still images of subjects, and a video image mode for obtaining video images of subjects. Although the camera 220 is illustrated in a different area of the housing 215 relative to the location of the camera 20 in the housing 215 described with regard to FIGS. 1-3, the camera 220 is the same as the camera 20 and will not be discussed in detail.

The illustrated detector 225 is similar to the detector 25 and includes the passive infrared ("PIR") sensor 55 and the lens 60 (e.g., a Fresnel lens). As illustrated in FIG. 4, the detector 225 also includes a curtain 255 that is movable between a first position in which the curtain 225 does not cover or block a portion of the lens 60, and a second position in which the curtain 225 covers or blocks a portion of the lens 60 to adjust the field of view of the detector 225. The illustrated detector 225 and the curtain 255 are described in detail in commonly assigned U.S. patent application Ser. No. 13/645,230, filed Oct. 4, 2012, the contents of which are incorporated herein by reference.

The first illumination device 230 has a first light source 260 and is removably coupled to the housing 215 within a first slot or pocket 265, and the second illumination device 235 has a second light source 270 and is removably coupled to the housing 215 within a second slot or pocket 275 located below the first pocket 265. The relative orientation of the first and second illumination devices 260, 270 can be reversed. In some constructions, the first and second light source modules 260, 270 can be arranged side-by-side or in other patterns. Although the illustrated modules 260, 270 are positioned in pockets 265, 275 that are separated and partially defined by a partition or wall 277, the housing 215 can have one relatively large pocket that accommodates both modules 260, 270. In these constructions, the unitary pocket can have a rib adjacent the blind end of the pocket to assist with sealing and securing the modules 260, 270 in the housing 215.

Each illumination device 230, 235 has one or more circuit boards that operably and electrically mate with an internal circuit board in the housing 215 that has two sets of electrical connections (e.g., bus connections including three power rails and two data bus signals). For example, the electrical connections on the modules 260, 270 can include respective pin connectors 280, 285 (e.g., spring-loaded pins) that are received in and that electrically and mechanically engage pin holes 290, 295 located adjacent the rear or blind end of the pockets 265, 275 (i.e. adjacent the rear of the housing 215). In other constructions, the pin connectors 280, 285 can be provided in the housing 215 and the pin holes 290, 295 can be provided on the modules 260, 270. Other electrical connections between the housing 215 and the light source modules 260, 270 are possible and considered herein.

The first light source 260 has a plurality of first light elements 300 (e.g., LEDs, strobe, etc.) that are capable of illuminating a subject at the first peak wavelength of light (e.g., 850 nm) when the camera 220 is capturing an image. As illustrated, the first light elements 300 are arranged in two rows, although fewer or more light elements 300 can be provided in one or more rows, other patterns, or randomly in the first light source 260.

The second light source 270 has a plurality of second light elements 305 (e.g., LEDs, strobe, etc.) that are capable of illuminating a subject at the second peak wavelength of light (e.g., 940 nm) when the camera 220 is capturing an image. As illustrated, the second light source 270 has three light elements 305 arranged in single row, although fewer or more light elements 305 can be provided in one or more rows, other patterns, or randomly in the second light source 270.

As illustrated in FIG. 4, the quantity of light elements 300 associated with the first light source 260 exceeds the quantity of light elements 305 associated with the second light source 270, although the light sources 260, 270 can have the same quantity of light elements 300, 305, or the second light source 270 can have more light elements than the first light source 260. Each illumination device 230, 235 can be independently removed or installed relative to the housing 215 within the respective pockets 265, 275. A transparent window 310 encloses the illumination devices 230, 235 after insertion into the housing 215 to protect the light sources 260, 270 from the environment while also providing exposure (i.e. a clear line of sight) for the illumination device 230. The illustrated illumination devices 230, 235 and the window 310 are secured to the housing 215 via a plate or bezel 315 that is attached to the housing 215 by fasteners 320, although the illumination devices 230, 235 and the window 310 can be held in place in other ways.

The camera assembly 210 including the light sources 260, 270 operates in the same manner as described with regard to the camera 10 including the light sources 70, 80 described above. The removable, replaceable illumination devices 230, 235 define a customizable camera assembly 210 with "plug-and-use" light sources that can be interchanged or replaced with other devices that have the same or different peak wavelengths of light (e.g., to capture images that are better illuminated at other peak wavelengths of light other than 850 nm or 940 nm, to intensify the light emitted, etc.). In some constructions, the relative locations of the illumination devices 230, 235 can be rearranged in the housing 215 by inserting the second illumination device 235 into the first pocket 265 and inserting the first illumination device 230 into the second pocket 275. In other constructions, two of the same illumination devices 230, 235 (either device 230 or device 235) can be installed in the pockets 265, 275 to double the intensity of the wavelength of light emitted from the camera assembly 210. For example, two first illumination devices 230 having a peak wavelength of approximately 850 nm can be installed in the housing 215 to assist the camera 220 with taking still images in low light conditions. Likewise, two second illumination devices 235 having a peak wavelength of approximately 940 nm can be installed in the housing 215 to assist the camera 220 with taking video images in low light conditions.

The illumination devices 230, 235 are inserted and removed from adjacent the front of the camera assembly 210. A user removes the bezel 315 via the fasteners 320 to expose the illumination devices 230, 235 (or the pockets 265, 275 when no modules are attached to the camera assembly 210). Each illumination device 230, 235 is dropped or slid into its own pocket 265, 270 so that the pin connectors 280, 285 engage the corresponding pin holes 290, 295. The bezel 315 is replaced over the window 310 and secured to the housing 215 using the fasteners 320.

Figure 5:
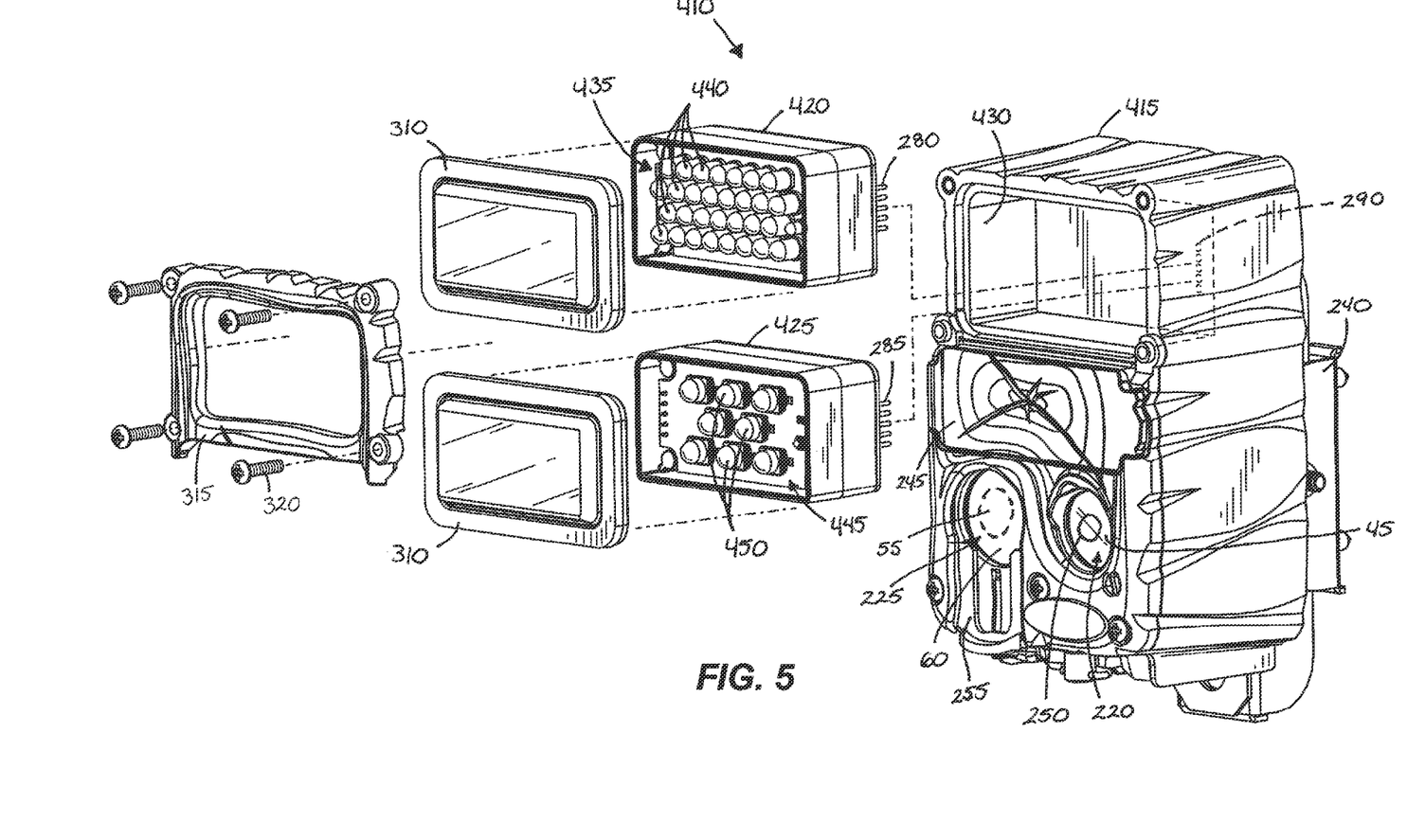
FIG. 5 is a perspective view of another camera assembly including the camera and an illumination device embodying the invention.

FIG. 5 illustrates yet another camera assembly 410 that can be attached to a mounting structure (e.g., a tree, a post, etc.). Except as described below, the camera assembly 410 is the same as the camera assemblies 10, 210 described with regard to FIGS. 1-4.

The camera assembly 410 includes a housing 415 that supports the camera 220, the detector 225, a first illumination device 420, and a second illumination device 425. Each illumination device 420, 425 is modular and can be used to take pictures and/or video (described collectively as media) of subjects (e.g., wildlife). As shown in FIG. 5, the illustrated housing 415 defines a single or unitary pocket 430 that supports one illumination device (e.g., either illumination device 420 or illumination device 425) at a time in a manner similar to how the housing 15 supports the illumination device 30. The first and second illumination devices 420, 425 are interchangeable with each other and replaceable by other illumination devices so that the camera assembly 410 can be customized to lighting conditions and other factors that affect media being taken of subjects in a manner similar to the description of the interchangeable, replaceable first and second light source modules 260, 270 described with regard to FIG. 4.

The illustrated first illumination device 420 includes a first light source 435 that has light elements 440 capable of emitting infrared light at a first peak wavelength, and the second illumination device 425 includes a second light source 445 that has light elements 450 capable of emitting infrared light at a second, different peak wavelength. Although the illustrated first illumination device 420 includes light sources 435, 445 that have different quantities of light elements 440, 450, it will be appreciated that the quantities among the first and second light sources 435, 445 can differ from each other. Also, each light source 435, 445 can include one or more light elements 440, 450 arranged in a pattern or randomly.

Each illumination device 420, 425 has one or more circuit boards that operably and electrically mate with an internal circuit board in the housing 415 via the pin connectors 280, 285 and the pin holes 290. As illustrated, a transparent window 310 encloses the device 420, 425 that is disposed in the pocket 430, and a plate or bezel 315 is secured over the window 310 using fasteners 320. One illumination device 420, 425 is inserted and removed relative to the housing 415 from adjacent the front of the camera assembly 410. A user removes the bezel 315 via the fasteners 320 to expose the installed device 420, 425 (or the pocket 430 when no device is attached to the camera assembly 410). The window 310 and the bezel 315 are replaced after the desired illumination device is inserted into the housing 415. As described with regard to the camera assembly 410, the removable, replaceable illumination devices 420, 425 provide "plug-and-use" light sources 435, 445 and can be interchanged or replaced with other devices that have light sources with the same or different peak wavelengths of light (e.g., to capture images that are better illuminated at other peak wavelengths of light other than 850 nm or 940 nm).

In response to the signal from the sensor 55, the control unit 65 automatically configures the illumination device 30, 230 as needed to illuminate the subject whose image is being captured using at least one of the first and second peak wavelengths of light. That is, the control unit 65 controls the illumination device 30, 230 so that at least one or both of the first and second light sources 70, 80, 260, 270 is used to illuminate the subject when there is insufficient ambient or natural light to illuminate the subject. In circumstances where sufficient ambient or natural light is available, the illumination device 30, 230 will not be triggered to illuminate the subject. In the illustrated embodiment, the control unit 65 communicates with the illumination device 30, 230 to operate the first light source 70, 260 when the camera 20, 220 is capturing a still image, and to operate the second light source 80, 270 when the camera 20, 220 is capturing a video image. Also, the control unit 65 communicates with illumination device 30, 230 to consecutively operate the first light source 70, 260 and the second light source 80, 270 when the camera 20, 220 is consecutively capturing a still image and a video image.

The control unit 65 determines the camera mode from the selector switch 95 and automatically configures the camera assembly 10 to use the first light source 70, the second light source 80, or both light sources 70, 80 based on the camera mode. In the still image mode, the subject is illuminated using the first light source 70 for a brief period of time (e.g., approximately 0.25 seconds) to capture a still image of the subject. Due to the relatively short timeframe associated with the still image mode, any light produced by the first light source 70 that may be visible to the subject is unlikely to attract attention from the subject. As a result, the camera 20 uses the first light source 70, which generally provides the better lighting and results in better images.

In the video image mode, the subject must be illuminated over a longer timeframe to adequately capture a video image of the subject. In this mode, the control unit 65 uses the second light source 80 with the second peak wavelength of light, which is relatively invisible to the subject, to avoid attracting attention from the subject when the camera 20 is in the video mode. In the hybrid image mode, the control unit 65 illuminates the subject using the first light source 70 for capturing the still image, and illuminates the subject using the second light source 80 to capture the video image.

The control unit 65 dynamically controls the illumination device 30 at different peak wavelengths of light based on the camera mode to reduce the amount of visible light emanating from the camera assembly 10 while still capturing high-quality still images. In some constructions, the camera assembly 10 can be programmed to use both the first and second light sources 70, 80 when taking a still image, thereby enhancing the amount of light and improving the quality of the image. In yet another alternative embodiment, the camera assembly 10 can be provided with an override (e.g., a switch or a setting in the camera programming) so that a user can manually specify the wavelength of light used to illuminate the subject. For example, in these constructions, the camera assembly 10 can be manually configured so that the subject is illuminated using either the first light source 70 or the second light source 80 in all camera modes (e.g., the still image mode, the video image mode, or the hybrid image mode).

Various features and advantages of the invention are set forth in the following claims.

The invention claimed is:

1. A camera assembly comprising:
   a camera having an image-capturing device and capable of capturing still images and video images;
   an illumination device coupled to the camera and adapted to illuminate a subject when the camera is capturing an image, the illumination device being capable of illuminating in at least two different peak wavelengths, the illumination device having a first light source having a first peak wavelength and a second light source having a second peak wavelength; and
   a control unit that automatically configures the camera assembly to use one or more of the at least two different wavelengths,
   wherein the control unit is configured to illuminate using the first light source when capturing a still image and to illuminate using the second light source when capturing a video image.

2. A camera assembly as claimed in claim 1, wherein the camera comprises a digital receiver.

3. A camera assembly as claimed in claim 1, wherein the camera is capable of capturing still images and video images.

4. A camera assembly as claimed in claim 1, wherein the illumination device comprises a first LED having a first peak wavelength and a second LED having a second peak wavelength.

5. A camera assembly as claimed in claim 4, wherein the first peak wavelength is about 850 nm and the second peak wavelength is about 940 nm.

6. A camera assembly as claimed in claim 4, wherein the illumination device comprises a plurality of first LEDs and a plurality of second LEDs, and wherein there are more first LEDs than second LEDs.

7. A camera assembly as claimed in claim 1, wherein the camera assembly includes a still image mode and a video image mode, and wherein the control unit is programmed to automatically configure the camera assembly to use the first light source for illumination in the still image mode and to use the second light source for illumination in the video image mode.

8. A camera assembly as claimed in claim 7, wherein the camera assembly further includes a hybrid mode that will take a still image using the first light source and also take a video image using the second light source.

9. A camera assembly as claimed in claim 7, further comprising a selector for selecting between the still image mode and the video image mode.

10. A camera assembly as claimed in claim 1, wherein the first light source comprises a first LED and the second light source comprises a second LED.

11. A method of operating a camera assembly including a camera having an image-capturing device and an illumination device capable of illuminating at a plurality of peak wavelengths, the camera further having an operating parameter, the operating parameter includes an image mode having a still image mode and a video image mode, the method comprising:
   determining the operating parameter of the camera;
   selecting a selected peak wavelength based upon the operating parameter;
   capturing an image with the image-capturing device; and operating the illumination device only at the selected peak wavelength during the step of capturing an image, wherein the illumination device is capable of illuminating at a first peak wavelength and at a second peak wavelength longer than the first peak wavelength, wherein determining includes determining whether the camera is in the still image mode or the video image mode, and wherein selecting includes:

selecting the first peak wavelength if the camera is in the still image mode and selecting the second peak wavelength if the camera is in the video image mode.

12. A method of operating a camera assembly as claimed in claim 11, wherein the first peak wavelength is about 850 nm and the second peak wavelength is about 940 nm.

13. A camera assembly comprising:

a housing supporting a camera having an image-capturing device, the housing defining a pocket;

a first illumination device removably coupled to the housing within the pocket and adapted to illuminate a subject at a peak wavelength when the camera is capturing an image;

a second illumination device removably coupled to the housing within the pocket adjacent the first illumination device and adapted to illuminate a subject at a peak wavelength when the camera is capturing an image; and a control unit that automatically configures the camera assembly to use one or both of the first and second illumination devices to illuminate a subject, wherein the camera is capable of capturing still images and video images, wherein the first illumination device comprises a first light source having a first peak wavelength and the second illumination device comprises a second light source having a second peak wavelength, and wherein the control unit is configured to illuminate using the first light source when capturing a still image and to illuminate using the second light source when capturing a video image.

14. A camera assembly as claimed in claim 13, wherein the first light source is a first LED and the second light source is a second LED.

15. A camera assembly as claimed in claim 13, wherein the camera assembly includes a still image mode and a video image mode, and wherein the control unit is programmed to automatically configure the camera assembly to use the first light source for illumination in the still image mode and to use the second light source for illumination in the video image mode.

16. A camera assembly as claimed in claim 15, wherein the camera assembly further includes a hybrid mode that will take a still image using the first light source and also take a video image using the second light source.

* * * * *

UNITED STATES PATENT AND TRADEMARK OFFICE
CERTIFICATE OF CORRECTION

| | | |
|---|---|---|
| PATENT NO. | : 8,810,718 B1 | Page 1 of 1 |
| APPLICATION NO. | : 13/788889 | |
| DATED | : August 19, 2014 | |
| INVENTOR(S) | : Mark J. Cuddeback | |

It is certified that error appears in the above-identified patent and that said Letters Patent is hereby corrected as shown below:

On the Title Page, Item (72) Inventor: delete "Mark O. Cuddeback" and insert --Mark J. Cuddeback--.

Signed and Sealed this
Seventeenth Day of March, 2015

Michelle K. Lee
*Director of the United States Patent and Trademark Office*